United States Patent [19]

Holiday

[11] Patent Number: 4,748,323
[45] Date of Patent: May 31, 1988

[54] JOYSTICK DEVICE WITH PHOTOELECTRIC TILT AND PUSH BUTTON DETECTION

[76] Inventor: Morton J. Holiday, 7686 Sherman Pl., Denver, Colo. 80221

[21] Appl. No.: 29,201

[22] Filed: Mar. 23, 1987

[51] Int. Cl.$^4$ .............................................. G01V 9/04
[52] U.S. Cl. ...................................... 250/221; 250/229
[58] Field of Search .................. 250/211 K, 221, 229; 340/709; 364/190; 200/6 A, 153 K

[56] References Cited

U.S. PATENT DOCUMENTS

| | | | |
|---|---|---|---|
| 3,811,047 | 5/1974 | Shragal | 250/211 K |
| 3,814,199 | 6/1974 | Jones | 250/229 |
| 4,445,541 | 5/1984 | Schmiel | 250/221 |
| 4,489,303 | 12/1984 | Martin | 338/128 |
| 4,533,827 | 8/1985 | Fincher | 250/211 K |
| 4,538,035 | 8/1985 | Pool | 200/6 A |
| 4,607,159 | 8/1986 | Goodson et al. | 250/229 |
| 4,614,847 | 9/1986 | Sasao | 200/153 K |

Primary Examiner—David C. Nelms
Attorney, Agent, or Firm—Fields, Lewis, Pittenger & Rost

[57] ABSTRACT

A joystick device disclosed has a plurality of light emitter-detector devices disposed around a control shaft in a casing supporting the shaft. A first blocking member on the control shaft selectively blocks out the light to one or two detectors which produces a change in electrical state at an output terminal of a signal processing circuit connected to each detector without the use of any physical contact or the use of mechanically operated electric switches. A second blocking member on an axially movable inner shaft actuated by a button interrupts the light from another light emitter-light detector device having a similar signal processing circuit. The output circuit connects to a plug-type connecting member that connects to a load device such as a joystick-operable computer or video game.

20 Claims, 3 Drawing Sheets

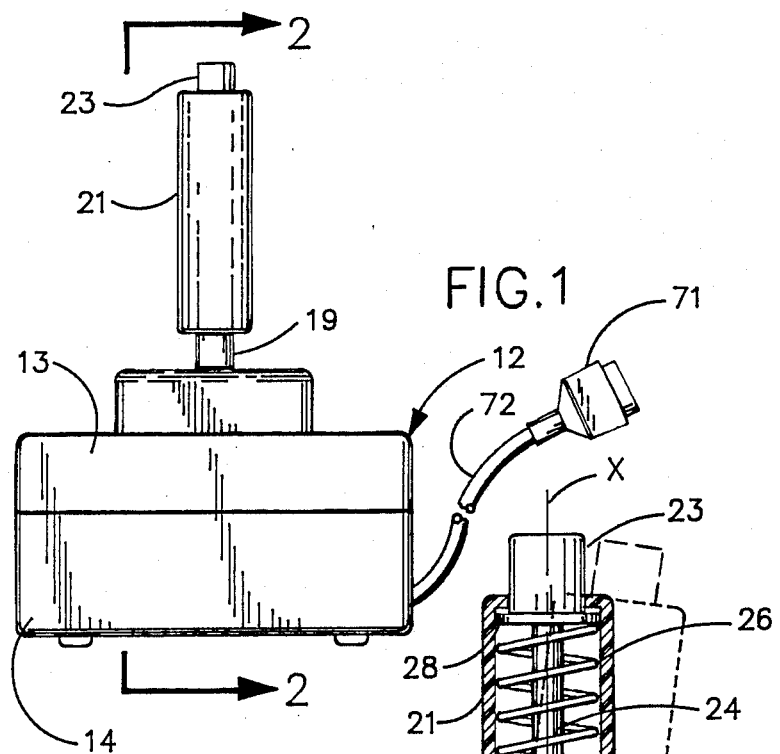
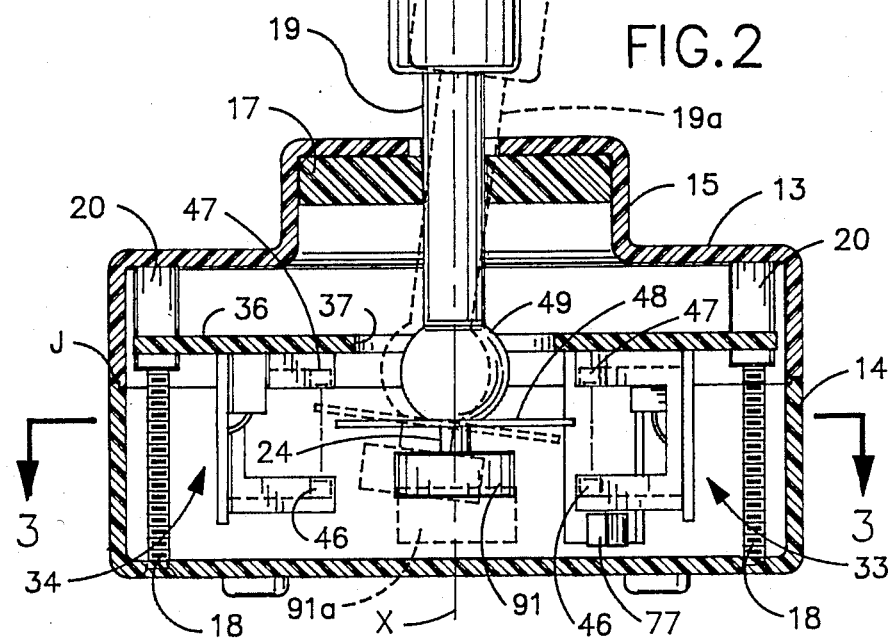

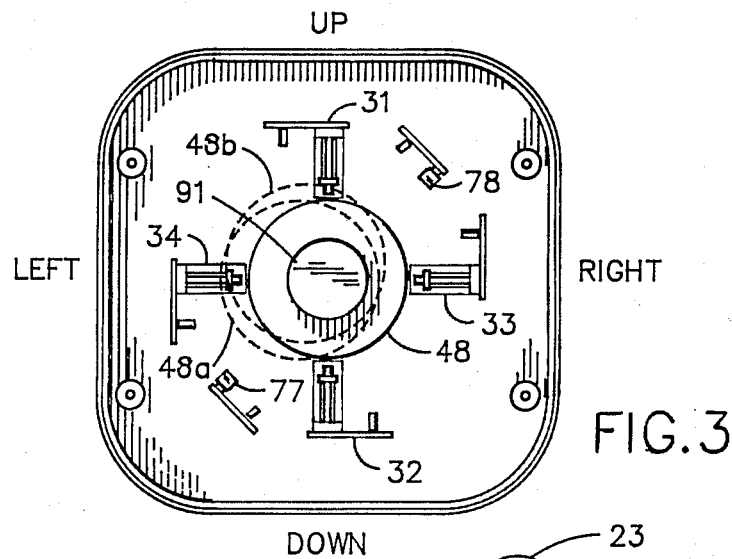
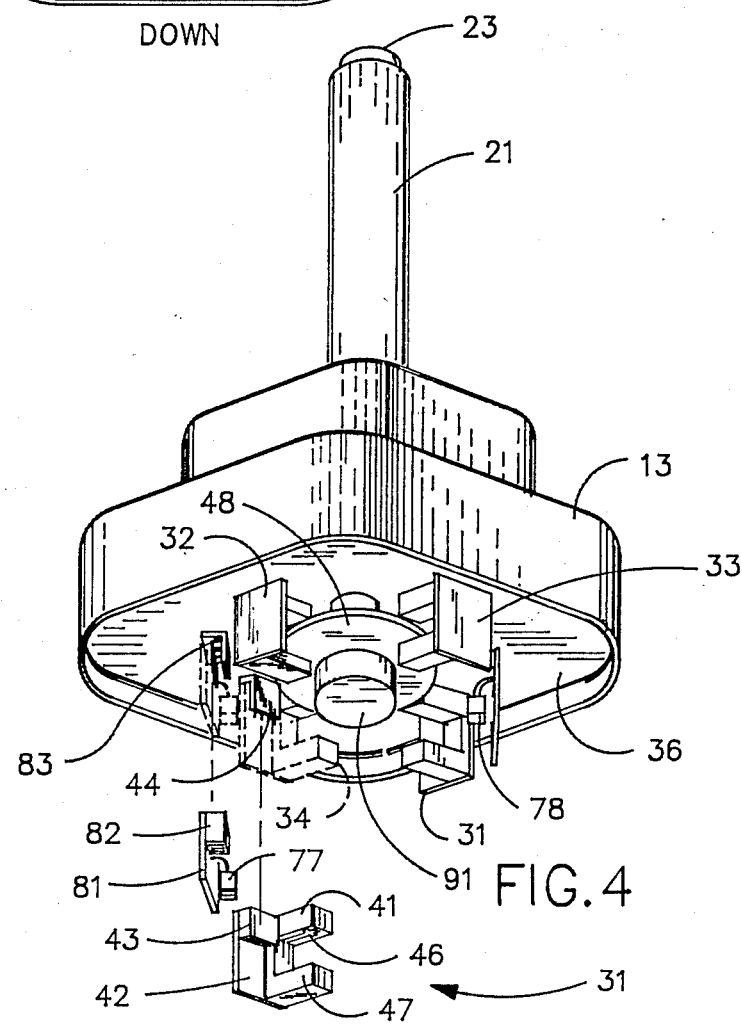

JOYSTICK DEVICE WITH PHOTOELECTRIC TILT AND PUSH BUTTON DETECTION

TECHNICAL FIELD

This invention relates generally to joystick-type control devices and more particularly to a novel and improved joystick device for controlling joystick-operable computers, video games and like loads.

BACKGROUND ART

Joysticks heretofore provided for operating computers and video games have used switch-pushing arms extending radially from a control shaft to physically depress mechanical contacts in electric switches at different positions about the shaft. An example of this type of joystick is found in U.S. Pat. No. 4,614,847. There is a tendency for the switch pushing arms or the mechanical contacts to break or malfunction after repeated use. An attempt to eliminate mechanical contacts in a joystick disclosed in U.S. Pat. No. 4,489,303 involves the use of Hall effect switches but there are drawbacks to using a magnetic field in association with computers and video games.

Other types of joysticks such as those disclosed in U.S. Pat. Nos. 4,445,541, 4,533,827, 4,538,035 and 4,607,159 produce specific electric control signals to drive a specific type of load but these are not suitable for controlling joystick-operable computers or video games.

DISCLOSURE OF THE INVENTION

A joystick device disclosed has a plurality of light emitter-detector devices located at selected positions on a circuit board about a control shaft. A light-blocking disc on the control shaft when moved to one side by tilting the shaft will interrupt the light preferably from one or two adjacent emitters to the associated detectors. Another light emitter and a light detector are disposed at opposite positions relative to the control shaft and below the control shaft and an inner shaft with light blocking disc is moved axially by depressing a button to interrupt the light to the associated detector. Each detector has a signal processing circuit connected thereto to which a supply voltage preferably from the load device is connected via a plug-type connecting member. Each circuit in response to an interruption of light to the associated detector provides an electrical change of state at an associated output terminal which is connected to a load device via the connecting member.

DESCRIPTION OF THE DRAWINGS

FIG. 1 is a side elevation view of a joystick device embodying features of the present invention.

FIG. 2 is a sectional view taken along lines 2—2 of FIG. 1 with exterior wall portions of the handle portion broken away to show interior parts.

FIG. 3 is a sectional view taken along lines 3—3 of FIG. 2.

FIG. 4 is a bottom plan view of the device with the bottom section of the casing removed and with one of each type of the circuits removed to show the removable mounting thereof on the circuit board.

DETAILED DESCRIPTION

Figure 5:
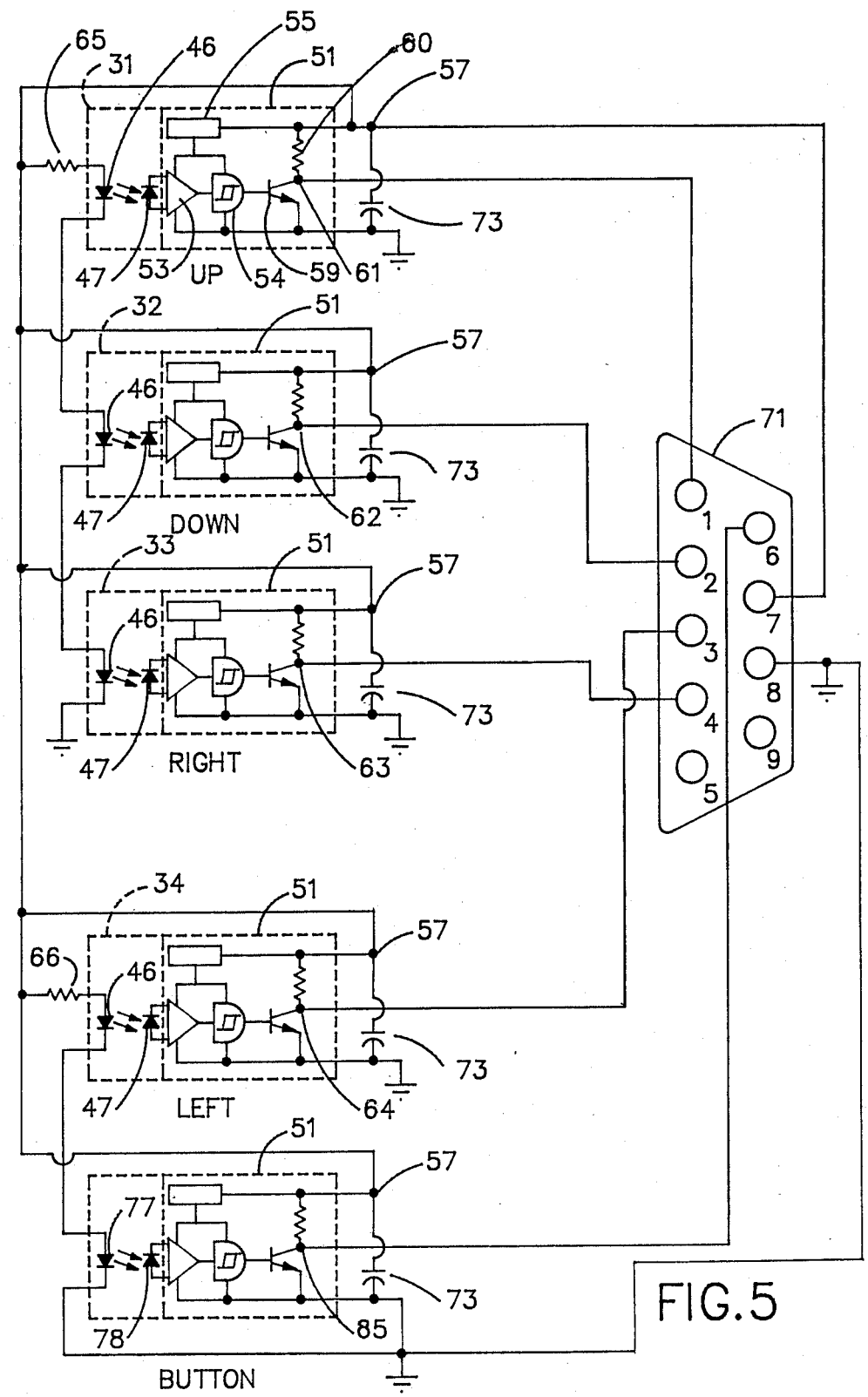
FIG. 5 is the electronic circuit diagram for the device shown in FIGS. 1-4.

Referring now to drawings there is shown a joystick device including a hollow casing 12 having an upper section 13 and a lower section 14 separable from the upper section at a lap-type joint J. The lower section is removably attached to the upper section by bolts 18 that extend through holes in the lower section and thread into posts 20 in the upper section. The upper section has a narrower neck portion 15 which carries a donut-shaped flexible shaft-supporting mount 17.

A control shaft 19 extends through the casing and is mounted in the flexible mount 17 so that the shaft will tilt about a vertical neutral position to any selected angle or tilt position shown in dashed lines at 19a from a vertical axis X. When the tilt forces are removed the mount 17 returns the shaft to the neutral position. The control shaft 19 has a handle or grip portion 21 at the upper end outside the casing for grasping by the user. The handle has a button 23 mounted in an opening in grip portion and is connected to the upper end of an inner shaft 24 concentrically disposed within control shaft 19 that will move axially up and down relative to the control shaft 19. A tension spring 26 within the handle portion normally moves against a lower flange 28 on the button to hold the button 23 in an up position.

A shaft tilt position sensing arrangement shown includes four identical light emitter-detector devices 31, 32, 33 and 34 arranged at 90 degree increments about the center of the control shaft. These devices are mounted on a circuit board 36 nesting in the upper section 13 and secured to the posts 20. The circuit board 36 has a center opening 37 through which the lower end of the control shaft 19 extends to be contained within the lower section 14.

Each light emitter-detector device has a C-shaped support member 41 having its back member mounted on a vertically disposed circuit board 42 which carries an associated signal processing circuit 51 (schematic FIG. 5). Each device further has a female connecting member 43 with a plurality of sockets into which the pins of a male connecting member will insert. A male connecting member 44 with pins that will insert into the sockets in member 43 is shown mounted on the circuit board 36. In this way the assembly consisting of support member 41, circuit board 42 and connecting member 43 are removably mounted on the circuit board 36. Each light emitter-detector device has a light emitter 46 mounted in the lower leg of support member 41 and a light detector 47 in the opposite upper leg of member 41 extending so the two are arranged parallel to and laterally spaced from the longitudinal axis of the control shaft and spaced apart from one another.

A light blocking member 48 in the form of a relatively thin plastic disc made of a material that will not pass light in the axial direction is mounted on the lower end of the control shaft 19 and extends generally transverse thereto. The shaft is provided with a round enlarged portion 49 above the lower end which serves as a stop and support for disc 48. The disc 48 in the at-rest position does not extend far enough radially to interrupt the light passing from one light emitter 46 to an associated light detector 47 but when a tilt force is applied by the user to the shaft as when the disc is tilted to one side as shown in dashed lines the light to the associated detector 47 is interrupted.

A similar separate signal processing circuit 51 is connected to the output of each detector 47 for the four above-described devices 31, 32, 33 and 34 and for the button detector 78 described hereinafter. The four devices 31, 32, 33 and 34 are designated UP, DOWN, RIGHT and LEFT, respectively, as viewed in FIG. 3. Referring to the circuit 51 designated UP in FIG. 5, circuit 51 shown therein includes an amplifier 53 connected across the detector 47 and a Schmidt-trigger 54 having its input connected to the output of the amplifier 53. A voltage regulator 55 connects between a supply voltage input terminal 57 to the circuit and the power inputs of the amplifier 53 and Schmidt-trigger 54. A transistor 59 has its base connected to the output of the Schmidt-trigger and its emitter connected to ground with a bias resistor 60 connected between the collector and terminal 57. In the operation of the circuit when the light to the detector 46 is interrupted a voltage produced at the output of the amplifier causes the Schmidt-trigger to produce a pulse at its output which in turn turns on the transistor so that the output terminal 61 goes from a high to a low state, i.e. 5 volts to 0 volts. Each circuit 51 has a by-pass capacitor 73 is connected between terminal 57 and ground externally of each circuit 51 to stabilize the voltage at terminal 57.

The output terminal for each circuit 51 is at the collector of transistor 59. These output terminals are designated by numerals 61, 62, 63 and 64 for devices 31, 32, 33 and 34, respectively. A resistor 65 is connected between input terminal 57 and a series circuit of the light emitters of devices 31, 32, and 33 to limit the current flow with the series circuit opposite terminal 57 being connected to ground through the light emitters.

A connecting member 71 electrically connects to the circuits 51 by means of an electric power line 72. Connecting member 71 shown is presently being used for connecting joysticks devices to a computer or Atari game has nine sockets. The sockets are used for the device of the subject invention and are designated by numerals 1–4 and 6–8. The sockets of connecting member 71 receive the male pins of a connecting member of a joystick-operable computer or Atari game. The connecting member 71 is particularly suited for connection to a joystick-operable video game or a computer in which there are four male plugs which connect to sockets 1–4 associated with the shaft tilt position, a male plug associated with the button socket 6, and two male plugs providing a supply voltage and ground which connect to sockets 7 and 8. Socket 7 receives a positive voltage such as +5 volts and socket 8 is normally connected to ground. This makes the device interchangeable with currently used joysticks which use mechanical contacts and radial arms as above discussed.

A button depression sensing arrangement includes a light emitter 77 and a light detector 78 mounted at diametrically opposite positions on the circuit board 36. Emitter 77 and detector 78 are mounted below the lower end of both the control shaft and the inner shaft 24 so that the detector 78 will normally receive light from the emitter 77. The emitter 77 is mounted on a circuit board 81 which carries an associated circuit 51 having a female connecting member 82 that fits into a male connecting member 83 on circuit board 36 to provide a removable mounting for the emitter 77. The mounting for the detector 78 is of the same removable construction from board 36. A current limiting resistor 66 is shown connected between input terminal 57 and the series circuit of emitter 46 of the LEFT device 34 and emitter 77 with this series circuit opposite terminal 57 being connected to ground.

A light blocking member in the form of a disc 91 made of a material that will not pass light is mounted on the lower end of the inner shaft so that when the button 23 is depressed the disc 91 will move to a lower position 91a indicated in dashed lines in FIG. 2. In this lower position disc 91 interrupts the flow of light to the detector 78 and the circuit 51 associated with the detector 78 will provide at output terminal 85 a change of electrical state indicating to the load device to which it is connected through member 71 the button 23 has been depressed.

In the operation of the above described device, when the control shaft is tilted as for example to the left position 48a in FIG. 3, the light of device 34 is interrupted between the associated light emitter and light detector output terminal 64 has a change of electrical state which is used by the computer or the video game to which socket 71 is connected. When the control shaft is moved to a position midway between devices 34 and 31 as indicated by lines 48b in FIG. 3 the associated light detectors have a change in electrical state. When the button 23 is depressed there is a change of electrical state at terminal 85. These changes in electrical state typically are from a high (5 volts) to a low (0 volts) for the device described herein.

A device found suitable for light emitters 46 is a GaAs infrared light emitting diode and the light detectors 47 is a photodiode. A mounting assembly with these elements and the electronic circuit 51 is available as a Sharp Part No. GP1A17. Devices found suitable for the light emitter 77 is a high directivity infrared light emitting diode TRW Part No. OP 260SL while the detector 78 is a photodiode and with the circuit is a Sharp Part No. IS436.

The particular devices as above listed will operate at a supply voltage as high as 17 volts D.C. By using a lower voltage such as 5 volts D.C. and with no mechanical or physical contact between parts the longevity of the device of the subject invention is greatly increased over the prior art devices discussed herein.

Although the present invention has been described with a certain degree of particularity, it is understood that the present disclosure has been made by way of example and that changes in details of structure may be made without departing from the spirit thereof.

What is claimed is:

1. A joystick device comprising:
    a casing supporting a control shaft disposed upright in a neutral position and movable to different tilt positions;
    shaft position sensing means responsive to the tilt of said control shaft to one of a plurality of selected tilt positions, said sensing means including
        a light emitter-detector device at each preselected shaft position to be sensed, each said device having a light emitter and a light detector spaced from one another along a line substantially parallel to said shaft in said neutral position and arranged so that light from each emitter is normally received by an associated detector,
        a first light blocking member mounted on said shaft extending transverse thereto which in response to the tilt of said shaft to a selected tilt position will interrupt the light passing from an emitter and to an associated detector at that selected tilt position,
    a signal processing first circuit operatively associated with each detector, each said first circuit providing a shaft position output terminal at which there is produced a change in electrical state when the light to the associated detector is interrupted by said first blocking member, and button position sensing means responsive to the actuation of a button on the end of said control shaft which axially moves an inner shaft disposed in said control shaft, said button position sensing means including a button light emitter and button light detector located at position opposite from one another along a line substantially perpendicular to the longitudinal axis of and below the lower end of said control shaft so that light from said button light emitter is normally received by said button light detector, a second blocking member mounted on said inner shaft which in response to actuation of said button interrupts the light passing from said button light emitter to said button light detector, and a signal processing second circuit associated with said button light detector, said second circuit providing a button position output terminal at which there is produced a change in electrical state when the light to the button light detector is interrupted by said second blocking member.

2. A device as set forth in claim 1 wherein said casing includes an upper section supporting the control shaft and a lower section removable from said upper section.

3. A device as set forth in claim 1 wherein said control shaft is mounted on a flexible mount means in said casing which automatically returns said control shaft to said neutral position after tilting forces have been removed.

4. A device as set forth in claim 1 wherein said control shaft has a handle portion at the upper end, said button being mounted for reciprocal movement in the upper end of said handle portion, said button being biased to an up position and movable axially along said handle portion.

5. A device as set forth in claim 1 wherein each said light emitter and said button light emitter is a light emitting diode.

6. A device as set forth in claim 1 wherein each said light detectors of said shaft position sensing means and each said button light detector is a photodiode.

7. A device as set forth in claim 1 wherein there are four light emitter-detector devices for said shaft position sensing means disposed at 90 degree increments corresponding to up, down, right and left positions for said control shaft.

8. A device as set forth in claim 1 wherein each associated light emitter and light detector of said shaft position sensing means are mounted on a generally C-shaped support having spaced parallel legs extending generally perpendicular to said control shaft.

9. A device as set forth in claim 1 including a circuit board mounted in said casing, said control shaft extending through an opening in said circuit board 10. A device as set forth in claim 9 wherein said light emitter-detector devices and associated first circuits are removably mounted from said circuit board.

11. A device as set forth in claim 10 wherein said button light emitter and button light detector and associated second circuit are removably mounted on said circuit board.

12. A device as set forth in claim 1 wherein said first light blocking member is in the form of a relatively thin circular disc made of a material that will not pass light mounted to the lower end of said control shaft.

13. A device as set forth in claim 10 wherein said disc is of a sufficient diameter in relation to the positions of said light emitter-detector device to block light to two adjacent of said detectors when tilted to a position midway between said two adjacent detectors.

14. A device as set forth in claim 1 wherein said second light block member is in the form of a circular disc made of a material that will not pass light and of a sufficient thickness to block the light in a direction radially of the disc when said button is depressed.

15. A device as set forth in claim 1 including an electric power line connected to said first and second circuits, said line having a connecting member at one end, said connecting member having one coupling portion of a male-female electric coupling connected via said power line to said output terminals.

16. A device as set forth in claim 15 wherein said one coupling portion has a female socket means to receive a male pin means.

17. A device as set forth in claim 15 wherein said connecting member has two coupling portions connected via said power line to which serve as voltage supply terminals from an external electric power source.

18. A device as set forth in claim 17 wherein said external electric power source has a D. C. voltage terminal and a ground terminal.

19. A device as set forthin claim 15 wherein each said first and second circuit includes an amplifier connected across the output of the associated detector, a Schmidt-trigger connected to the output of the amplifier, a transistor connected to the output of the Schmidt-trigger, and a voltage regulator supplying the correct level of voltage to said amplifier and said Schmidt-trigger.

20. A joystick device adapted for connection with joystick-operable electronic apparatus having a plurality input terminals each responsive to a change in an electrical state and having voltage supply terminal means, said joystick comprising:

a casing having a flexible mount;

a control shaft mounted on said flexible mount and extending from opposite ends thereof with the longitudinal axis of said shaft vertically disposed in a neutral position and movable against the resilient forces of said mount to different tilt positions, said flexible mount returning said shaft to the neutral position when tilt forces are removed;

shaft position sensing means responsive to the tilt of said control shaft to one of a plurality of selected tilt positions, said sensing means including a light emitter-detector device mounted on a circuit board in said casing at each preselected shaft position to be sensed, each said device having a light emitter and a light detector spaced from one another along a line substantially parallel to the longitudinal axis of said shaft in the neutral position and arranged so that light from each emitter is normally received by an associated detector, a first light blocking member mounted on said shaft extending transverse thereto which in response to the tilt of said shaft to a selected tilt position will interrupt the light passing from an emitter and to an associated detector at that selected tilt position, a signal processing first circuit operatively associated with each detector, each said first circuit providing a shaft position output terminal at which there is produced a change in electrical state when the light to the associated detector is interrupted by said first blocking member, and button position sensing means responsive to the actuation of a button on the end of said control shaft which axially moves an inner shaft in said control shaft, said button position sensing means including a button light emitter and button light detector mounted on said circuit board and located at positions opposite from one another along a line substantially perpendicular to the longitudinal axis of and below the lower end of said control shaft so that light from said button light emitter is normally received by said button light detector, a second blocking member mounted on said inner shaft which in response to actuation of said button interrupts the light passing from said button light emitter to said button light detector, and a signal processing second circuit associated with said button light detector, said second circuit responsive to a supply voltage providing a button position output terminal at which there is produced a change in electrical state when the light to the button light detector is interrupted by said second blocking member.

* * * * *